(12) United States Patent
Suzuki et al.

(10) Patent No.: US 11,884,503 B2
(45) Date of Patent: Jan. 30, 2024

(54) SHEET SEPARATION DEVICE, LAMINATOR, IMAGE FORMING APPARATUS, AND IMAGE FORMING SYSTEM

(71) Applicants: Yoshito Suzuki, Chiba (JP); Tomohiro Furuhashi, Kanagawa (JP); Wataru Takahashi, Tokyo (JP); Shinya Monma, Kanagawa (JP); Joji Akiyama, Kanagawa (JP); Yohsuke Haraguchi, Kanagawa (JP); Sho Asano, Kanagawa (JP); Wataru Nozaki, Kanagawa (JP)

(72) Inventors: Yoshito Suzuki, Chiba (JP); Tomohiro Furuhashi, Kanagawa (JP); Wataru Takahashi, Tokyo (JP); Shinya Monma, Kanagawa (JP); Joji Akiyama, Kanagawa (JP); Yohsuke Haraguchi, Kanagawa (JP); Sho Asano, Kanagawa (JP); Wataru Nozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/952,623

(22) Filed: Sep. 26, 2022

(65) Prior Publication Data
US 2023/0019928 A1    Jan. 19, 2023

Related U.S. Application Data

(63) Continuation of application No. 17/173,588, filed on Feb. 11, 2021, now Pat. No. 11,492,222.

(30) Foreign Application Priority Data

Feb. 19, 2020    (JP) .................................. 2020-026249

(51) Int. Cl.
*B32B 43/00*    (2006.01)
*B65H 5/06*    (2006.01)

(52) U.S. Cl.
CPC ........... *B65H 5/062* (2013.01); *B32B 43/006* (2013.01); *Y10T 156/1168* (2015.01);
(Continued)

(58) Field of Classification Search
CPC ............ B32B 43/006; Y10T 156/1168; Y10T 156/1174; Y10T 156/195; Y10T 156/1956; Y10T 156/1958
See application file for complete search history.

(56) References Cited

U.S. PATENT DOCUMENTS 5,656,127 A    8/1997    De Niel et al.
5,673,908 A    10/1997    Nagata et al.
(Continued)

FOREIGN PATENT DOCUMENTS

JP    H9164593 A    6/1997
JP    2006-160429 A    6/2006

*Primary Examiner* — Philip C Tucker
*Assistant Examiner* — Nickolas R Harm
(74) *Attorney, Agent, or Firm* — Harness, Dickey & Pierce, P.L.C.

(57) ABSTRACT

A sheet separation device separates a non-bonding portion of a two-ply sheet in which two sheets are overlapped and bonded together at a bonding portion of the two-ply sheet. The sheet separation device includes a winding roller and a gripper. The winding roller rotates and winds the two-ply sheet to separate the two-ply sheet. The gripper is disposed in the winding roller and configured to grip a gripped portion of the two-ply sheet at one end of the two-ply sheet without abutting a tip of the gripped portion at the one end of the two-ply sheet on a member.

20 Claims, 14 Drawing Sheets

(52) U.S. Cl.
CPC ...... *Y10T 156/1174* (2015.01); *Y10T 156/195* (2015.01); *Y10T 156/1956* (2015.01)

(56) References Cited

U.S. PATENT DOCUMENTS

| | | |
|---|---|---|
| 6,258,666 B1 | 7/2001 | Mizutani et al. |
| 6,802,926 B2 | 10/2004 | Mizutani et al. |
| 8,069,895 B2 | 12/2011 | Kuo et al. |
| 8,142,610 B2 | 3/2012 | Tani et al. |
| 9,377,634 B2 | 6/2016 | Zhang et al. |
| 2007/0151667 A1* | 7/2007 | Tani .................. B08B 7/00 156/760 |
| 2008/0185100 A1 | 8/2008 | Jang et al. |
| 2008/0236743 A1 | 10/2008 | Kye et al. |
| 2009/0288760 A1 | 11/2009 | Garben |
| 2011/0309184 A1 | 12/2011 | Tsai |
| 2014/0290864 A1 | 10/2014 | Ahn |
| 2018/0201466 A1 | 7/2018 | Saito et al. |
| 2018/0236744 A1 | 8/2018 | Suzuki et al. |
| 2018/0257900 A1 | 9/2018 | Suzuki et al. |
| 2018/0259895 A1 | 9/2018 | Shibasaki et al. |
| 2018/0265313 A1 | 9/2018 | Heishi et al. |
| 2019/0010011 A1 | 1/2019 | Watanabe et al. |
| 2019/0276263 A1 | 9/2019 | Hidaka et al. |
| 2019/0284008 A1 | 9/2019 | Sakano et al. |
| 2019/0284009 A1 | 9/2019 | Suzuki et al. |
| 2019/0284010 A1 | 9/2019 | Asami et al. |
| 2019/0284011 A1 | 9/2019 | Furuhashi et al. |
| 2019/0284012 A1 | 9/2019 | Yoneyama et al. |
| 2019/0367317 A1 | 12/2019 | Haraguchi et al. |
| 2020/0140222 A1 | 5/2020 | Takahashi et al. |
| 2020/0239265 A1 | 7/2020 | Suzuki et al. |
| 2020/0247107 A1 | 8/2020 | Morinaga et al. |
| 2020/0247636 A1 | 8/2020 | Furuhashi et al. |
| 2020/0338877 A1 | 10/2020 | Takahashi et al. |
| 2020/0341414 A1 | 10/2020 | Watanabe et al. |

* cited by examiner

FIG. 5A
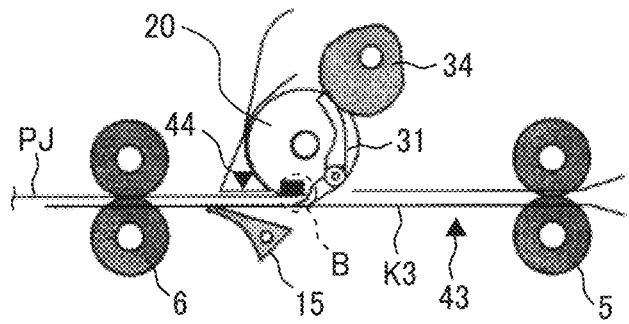
FIG. 5B
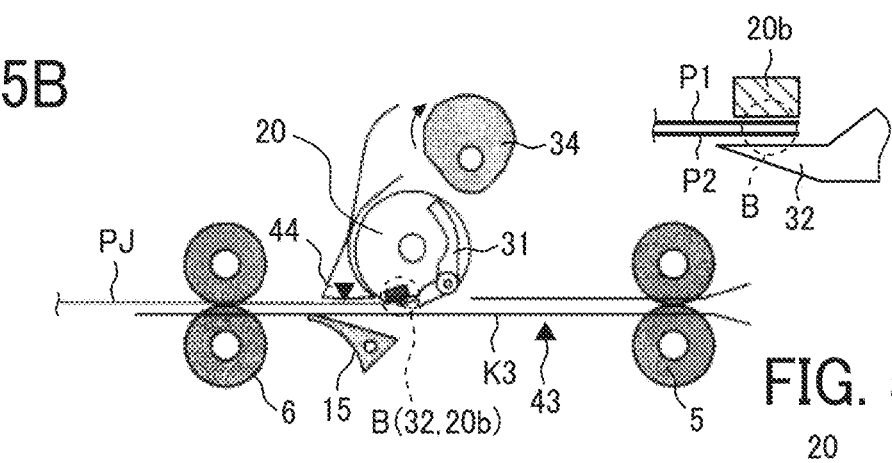
FIG. 5B'
FIG. 5C
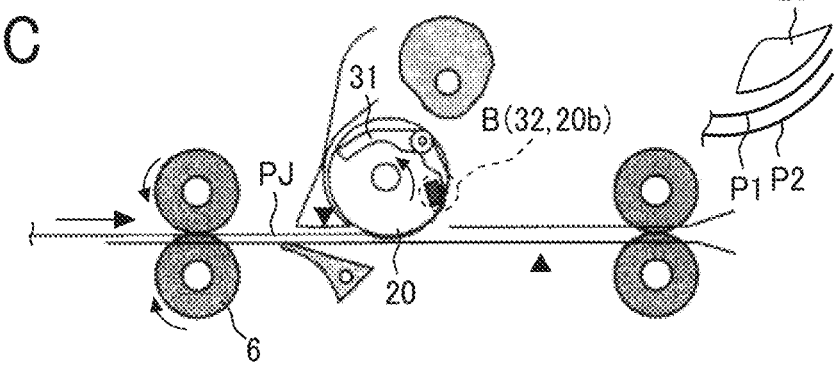
FIG. 5C'
FIG. 5D
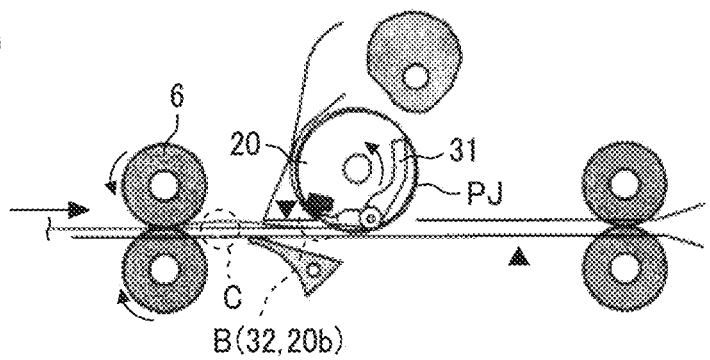

SHEET SEPARATION DEVICE, LAMINATOR, IMAGE FORMING APPARATUS, AND IMAGE FORMING SYSTEM

CROSS-REFERENCE TO RELATED APPLICATIONS

This patent application is a continuation of, and claims priority under 35 U.S.C. § 120 to U.S. application Ser. No. 17/173,588, filed Feb. 11, 2021, based on and claims priority pursuant to 35 U.S.C. § 119(a) to Japanese Patent Application No. 2020-026249, filed on Feb. 19, 2020, in the Japan Patent Office, the entire disclosure of each of which are incorporated by reference herein.

BACKGROUND

Technical Field

This disclosure relates to a sheet separation device configured to separate a two-ply sheet in which two sheets are overlapped and bonded together at a bonding portion of the two-ply sheet, a laminator incorporating the sheet separation device, an image forming apparatus incorporating the sheet separation device, such as a copier, printer, facsimile machine, and a multi-functional apparatus including at least two functions of the copier, printer, and facsimile machine, and an image forming system incorporating the sheet separation device.

Related Art

A sheet separation device (i.e. a laminator) separates a two-ply sheet in which two sheets are overlapped and bonded together at a bonding portion of the two-ply sheet.

SUMMARY

This specification describes an improved sheet separation device that separates a non-bonding portion of a two-ply sheet in which two sheets are overlapped and bonded together at a bonding portion of the two-ply sheet. The sheet separation device includes a winding roller and a gripper. The winding roller rotates and winds the two-ply sheet to separate the two-ply sheet. The gripper is disposed in the winding roller and configured to grip a gripped portion of the two-ply sheet at one end of the two-ply sheet without abutting a tip of the gripped portion at the one end of the two-ply sheet on a member.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A to 5D are schematic views of the main part of the sheet separation device illustrated in FIG. 1, illustrating operations of the sheet separation device, subsequent from the operations of FIGS. 4A to 4D;

FIG. 11 including

Figure 1:
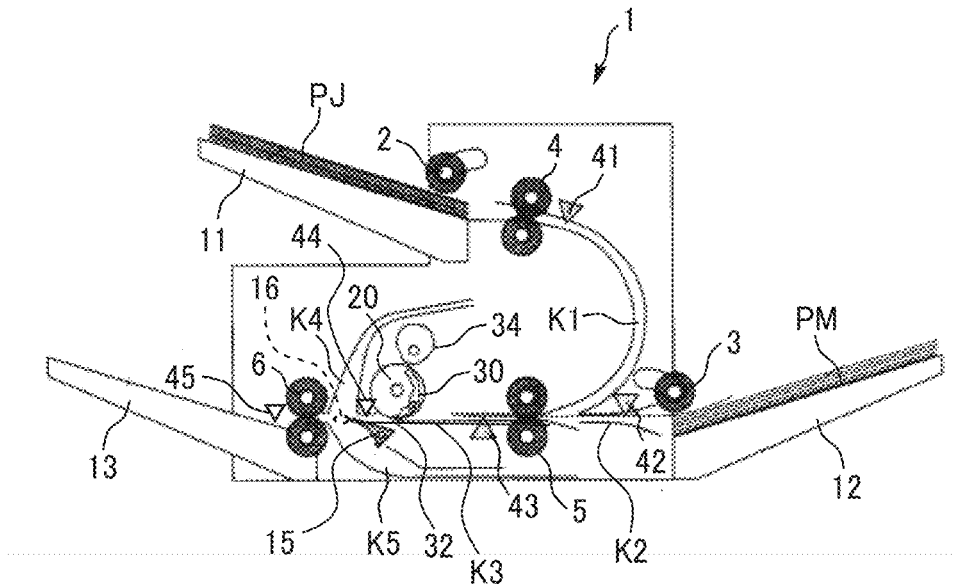
FIG. 1 is a schematic view illustrating an overall configuration of a sheet separation device according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise. Identical reference numerals are assigned to identical components or equivalents and a description of those components is simplified or omitted.

A configuration and operations of a sheet separation device 1 are described below with reference to FIG. 1.

Figure 4A:
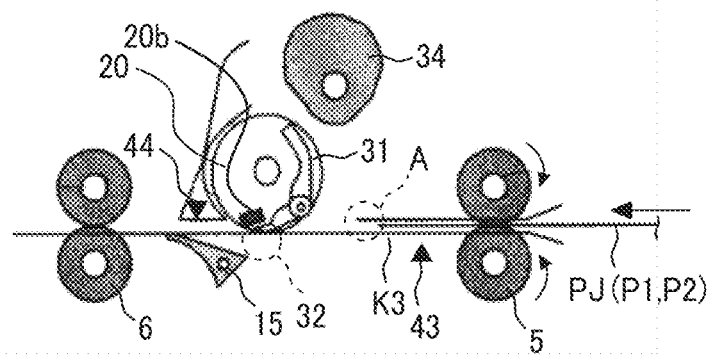
FIGS. 4A to 4D are schematic views of the main part of the sheet separation device illustrated in FIG. 1, illustrating operations of the sheet separation device.

The sheet separation device 1 separates a two-ply sheet PJ in which two sheets P1 and P2 are overlapped and bonded together at a bonding portion A of the two-ply sheet (see FIG. 4A).

The two-ply sheet PJ in the present embodiment is made of two sheets P1 and P2 overlapped and bonded together at one side of the four sides as the bonding portion A. That is, in the two-ply sheet PJ made of two sheets P1 and P2, only one sides of the two sheets P1 and P2 are connected by thermal welding or the like as the bonding portion A, and the other sides of the two sheets P1 and P2 are overlapped and not connected as non-bonding portions. As the two sheets P1 and P2 constituting the two-ply sheet PJ, a transparent film sheet (that is, a laminate sheet) may be used.

The two-ply sheet PJ may be made by folding a single sheet. In the present disclosure, the two-ply sheet PJ made by folding a single sheet is also defined as the two sheets overlapped, a folded portion of the folded single sheet is defined as the bonding portion, and the other portions are defined as the non-bonding portions.

Between the winding roller 20 and the third conveyance roller pair 6, the sheet separation device 1 separates the two sheets P1 and P2 constituting the tow-ply sheet PJ at the non-bonding portion. The sheet separation device 1 separates the two sheets P1 and P2 around the bonding portion A that maintains bonding the two sheets P1 and P2. Subsequently, the sheet separation device 1 inserts an insertion sheet PM between the separated two sheets P1 and P2. The insertion sheet PM is a sheet such as one plain sheet.

As illustrated in FIG. 1, the sheet separation device 1 includes a first feed tray 11, a second feed tray 12, a first feed roller 2, a second feed roller 3, a first conveyance roller pair 4, a second conveyance roller pair 5, a third conveyance roller pair 6, an ejection tray 13, a first sensor 41, a second sensor 42, a third sensor 43, a fourth sensor 44, a fifth sensor 45, a winding roller 20, a moving mechanism 30, a switching claw 15, and separation claws 16.

Additionally, the sheet separation device 1 includes a plurality of conveyance paths such as a first conveyance path K1, a second conveyance path K2, a third conveyance path K3, a first branched conveyance path K4, and a second branched conveyance path K5. The above-described conveyance paths K1 to K5 each include two conveyance guide plates facing each other to guide and convey the sheet such as the two-ply sheet PJ or the insertion sheet PM.

Specifically, the two-ply sheet PJ is stacked on the first feed tray 11. The first feed roller 2 feeds the uppermost two-ply sheet PJ on the first feed tray 11 to the first conveyance roller pair 4, and the first conveyance roller pair 4 conveys the two-ply sheet PJ along the first conveyance path K1.

The insertion sheet PM is stacked on the second feed tray 12. The second feed roller 3 feeds the uppermost insertion sheet PM on the second feed tray 12 to the second conveyance path K2.

Each of the first to third conveyance roller pairs 4 to 6 includes a drive roller and a driven roller each having an elastic layer made of rubber or the like formed on a core, and conveys the sheet nipped in a nip between the drive roller and the driven roller. The third conveyance path K3 is a path from the second conveyance roller pair 5 to the third conveyance roller pair 6 and includes, from the upstream side, the second conveyance roller pair 5, the winding roller 20, and the third conveyance roller pair 6. The third conveyance roller pair 6 is configured to be able to rotate in forward or in reverse, rotates in forward to convey the sheet in a forward direction, and rotates in reverse to convey the sheet in a reverse direction. The third conveyance roller pair 6 also functions as an ejection roller pair that ejects the sheet to the ejection tray 13.

Each of the first to fifth sensors 41 to 45 is a reflective photosensor that optically detects whether the sheet is present at the position of each sensor. The first sensor 41 is disposed in the vicinity of the downstream side of the first conveyance roller pair 4. The second sensor 42 is disposed in the vicinity of the downstream side of the second feed roller 3. The third sensor 43 is disposed between the second conveyance roller pair 5 and the winding roller 20 in the vicinity of the downstream side of the second conveyance roller pair 5. The fourth sensor 44 serving as a sheet detection sensor is disposed upstream the third conveyance roller pair 6 in the vicinity of the downstream side of the winding roller 20. The fifth sensor 45 is disposed downstream the third conveyance roller pair 6.

The winding roller 20 is described below with reference to FIGS. 2A to 3B (and FIGS. 5B to 5D and FIG. 6A).

In the winding roller 20, a gripper 32 that is one example of a gripper grips a gripped portion B of the two-ply sheet PJ. The gripped portion B is one end of the two-ply sheet PJ that is opposite an end at which the bonding portion A is formed. While the gripper 32 grips the gripped portion B of the two-ply sheet PJ, the winding roller 20 rotates in a predetermined rotation direction to wrap the two-ply sheet PJ around the winding roller 20. The winding roller 20 can rotate about a rotation shaft 20a in forward and in reverse. A controller controls a drive motor that drives the winding roller 20.

Specifically, as illustrated in FIG. 1, the two-ply sheet PJ starts from the first feed tray 11 and passes through the first conveyance path K1, and the second conveyance roller pair 5 conveys the two-ply sheet PJ in the forward direction along the third conveyance path K3. The two-ply sheet passes through a position of the winding roller 20 once and is conveyed to a position of the third conveyance roller pair 6. Thereafter, the third conveyance roller pair 6 rotates in reverse to convey the two-ply sheet PJ in the reverse direction to the position of the winding roller 20. The gripper 32 grips the two-ply sheet PJ and the winding roller 20 rotates counterclockwise to wrap the two-ply sheet PJ around the winding roller 20.

Figure 6A:
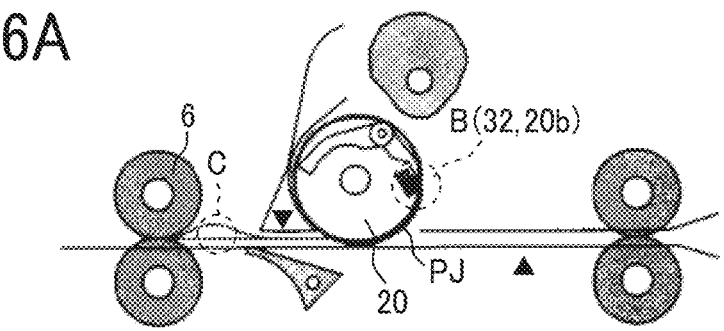
FIGS. 6A to 6C are schematic views of the main part of the sheet separation device illustrated in FIG. 1, illustrating operations of the sheet separation device, subsequent from the operations of FIGS. 5A to 5D.

With reference to FIG. 5C', the linear velocity of the sheet P1 and the linear velocity of sheet P2 each are proportional to a distance from the center of the winding roller 20 to each of the sheets P1 and P2 like the linear velocity of the roller surface that is proportional to the radius of the roller when the two-ply sheet PJ is wrapped around the winding roller 20. Therefore, the linear velocity of the sheet P1 is slower than the linear velocity of the sheet P2 because the sheet P1 is nearer from the center of the winding roller 20 than the sheet P2. The slower sheet P1 that is referred to as a first sheet P1 is more likely to slacken than the sheet P2 that is referred to as a second sheet P2. As illustrated in FIGS. 5D and 6A, the upper first sheet P1 is bent upward and forms a gap C between the two sheets P1 and P2 in the vicinity of the bonding portion A that is referred to as the other end of the two-ply sheet PJ. As described above, the two sheets P1 and P2 that are in close contact with each other without any gap are separated from each other.

The following additionally describes a mechanism that winding the two-ply sheet PJ around the winding roller 20 generates the gap C in the two-ply sheet PJ between the winding roller 20 and the third conveyance roller pair 6.

In the two-ply sheet PJ wound around the winding roller 20, the gripped portion B of the two-ply sheet PJ gripped by the gripper 32 does not generate a slip between the sheets P1 and P2. However, winding the two-ply sheet PJ around the winding roller 20 generates the difference in winding circumferential length between the two sheets P1 and P2 and, therefore, causes a slip between the two sheets P1 and P2, and a conveyance amount of the inner sheet P1 is smaller than a conveyance amount of the outer sheet P2. As a result, slack occurs in the inner sheet P1 between the nip of the third conveyance roller pair 6 and the winding roller 20.

Winding the two-ply sheet PJ around the winding roller 20 one or more times additionally generates the difference in winding circumferential length between the inner circumference and the outer circumference by the thickness of the sheet and increases the slack.

Finally, the slack is accumulated between the third conveyance roller pair 6 and the winding roller 20, and the gap C is formed between the two sheets P1 and P2.

In the present embodiment, in order to significantly form the gap C as described above, the two-ply sheet PJ is wound around the winding roller 20 at least once or more.

In the present embodiment, winding the two-ply sheet PJ around the winding roller 20 can separate the two-ply sheet PJ without increasing the size and cost of the sheet separation device 1.

As illustrated in FIG. 5B', the gripper 32 is configured to grip the gripped portion B of the two-ply sheet PJ without abutting and contacting the end surface of the tip of one end of the gripped portion B on a member.

The "end surface" of the two-ply sheet is defined as a side surface extending in the thickness direction and connecting the front surface and the back surface of the two-ply sheet. Accordingly, there are four end surfaces of the rectangular two-ply sheet on the front, back, left, and right.

Specifically, the gripper 32 is configured to sandwich and grip the gripped portion B of the two-ply sheet PJ in a direction perpendicular to the sheet surface of the gripped portion B of the two-ply sheet PJ between the gripper 32 and a receiving portion 20b of the winding roller 20 without causing any member to abut on and restrict the end surface of the one end of the two-ply sheet PJ, in other words, without causing any member to hit or contact the end surface of the two-ply sheet PJ. The receiving portion 20b is a part of an outer circumferential portion of the winding roller 20 and faces the gripper 32. More specifically, the receiving portion 20b is disposed in a portion recessed inward from a virtual outer peripheral surface of the winding roller 20. The virtual outer peripheral surface is an outer cylindrical surface around which the two-ply sheet PJ is wound.

More specifically, the two-ply sheet PJ is not gripped and sandwiched by the gripper 32 and the receiving portion 20b in a state in which a specific member such as the gripper 32 abuts on the end surface of the one end (that is the tip of one end) to restrict the end surface. Without abutting the end surface of the one end that is the tip of the one end to any member, the two-ply sheet PJ is sandwiched and gripped by the outer gripper 32 and the inner receiving portion 20b.

That is, the end surface of the one end (that is the tip of one end) of the two-ply sheet PJ does not abut against an obtuse angle portion (a wedge portion) of the gripper 32 in FIG. 5B', and the gripped portion B on the one end of the two-ply sheet PJ is gripped by the gripper 32 and the receiving portion 20b.

Without abutting on any member, the end surface of the one end (that is the tip of one end) of the two-ply sheet PJ coincides with an end of a contact surface of the receiving portion 20b at which the gripper 32 contacts the receiving portion 20b via the two ply sheet PJ, that is, a right end of the contact surface in FIG. 5B'.

The end surface of the one end (that is the tip of one end) of the two-ply sheet PJ may move to the right in FIG. 5B' beyond the contact surface between the gripper 32 and the receiving portion 20b so that the gripped portion B is inside the sheet from the tip of the one end, that is, the other end side from the tip of the one end. Alternatively, the end surface of the one end (that is the tip of one end) may be on a left point of the contact surface from the right end of the contact surface in FIG. 5B'.

Compared with a structure that abuts the end surface of the tip of the two-ply sheet on a member, the above-described structure can reduce a disadvantage that the two-ply sheet PJ (particularly, the tip of one end) is damaged.

In the present embodiment, the bonding portion A of the two-ply sheet PJ wound around the winding roller 20 is the other end of the two-ply sheet PJ. The other end is opposite to the one end serving as the gripped portion B.

In the present embodiment, at least one of the gripper 32 and the receiving portion 20b is made of elastic material such as rubber or includes an elastic part such as a spring, or a flat spring.

Compared with a sheet separation device including the gripper 32 and the receiving portion 20b that are rigid bodies made of metal or resin, the above-described sheet separation device can increase a gripping force to grip the two-ply sheet PJ and prevent surfaces of the two-ply sheet PJ from being damaged. In particular, the sheet separation device including the gripper 32 and the receiving portion 20b made of the elastic material easily exhibits the above-described effect.

As illustrated in FIGS. 2A to 3B, the moving mechanism 30 moves the gripper 32 between a gripping position (a position illustrated in FIGS. 2A and 3A) at which the gripper 32 can grip the two-ply sheet PJ and a releasing position (a position illustrated in FIGS. 2B and 3B) at which the gripper 32 is released from the gripping position.

Specifically, the moving mechanism 30 includes an arm 31, a compression spring 33 as a biasing member, a cam 34, and a motor that rotates the cam 34 in forward or in reverse.

The arm 31 holds the gripper 32 and is held by the winding roller 20 to be rotatable about a support shaft 31a. In the present embodiment, the gripper 32 is connected to a base of the arm 31, that is, the tip of arm 31, and the gripper 32 and the arm 31 are made as one part. Alternatively, the gripper 32 and the arm 31 may be made as separate members, and the gripper 32 may be disposed on the arm 31, that is, may be held by the arm 31. In any case, the arm 31 holding the gripper 32 rotates around the rotation shaft 20a together with the gripper 32 and the winding roller 20.

Figure 2A:
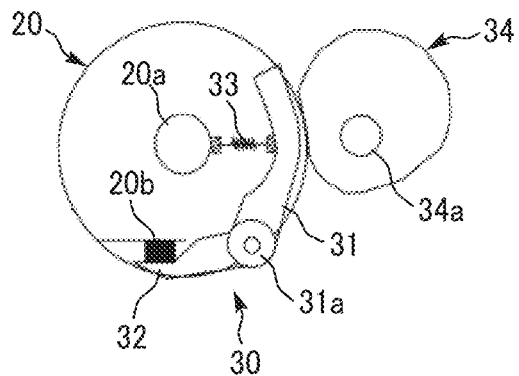
FIG. 2A is a side view illustrating a gripper that has moved to a gripping position in the sheet separation device illustrated in FIG. 1.
Figure 2B:
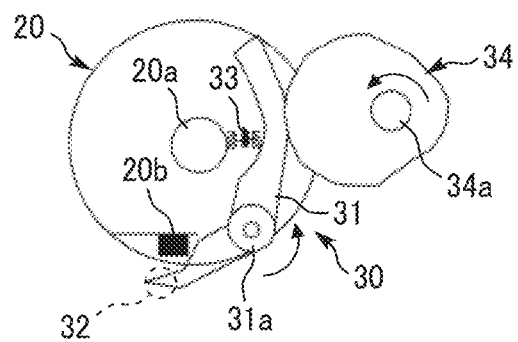
FIG. 2B is a side view illustrating the gripper that has moved to a releasing position in the sheet separation device illustrated in FIG. 1.

The compression spring 33 functions as a biasing member that biases the arm 31 so that the gripper 32 moves from the releasing position illustrated in FIG. 2B to the gripping position illustrated in FIG. 2A. Specifically, one end of the compression spring 33 is connected to a fixed part near the rotation shaft 20a, and the other end the compression spring 33 is connected to one end of the arm 31 that is a free end opposite to the other end of the arm 31 connected to the gripper 32 with respect to the support shaft 31a.

The cam 34 pushes the arm 31 against the biasing force of the compression spring 33 as the biasing member so that the gripper 32 moves from the gripping position illustrated in FIG. 2A to the releasing position illustrated in FIG. 2B. A motor controlled by the controller drives the cam 34 to rotate in forward or in reverse at a desired rotation angle.

The cam 34 is held by the apparatus housing so as to be rotatable about a cam shaft 34a independently of the winding roller 20.

In the moving mechanism 30 configured as described above, as illustrated in FIGS. 2A and 3A, the arm 31 not contacting the cam 34 is biased by the compression spring 33 and presses the gripper 32 against the receiving portion 20b. This state is referred to as a closed state.

Figure 3A:
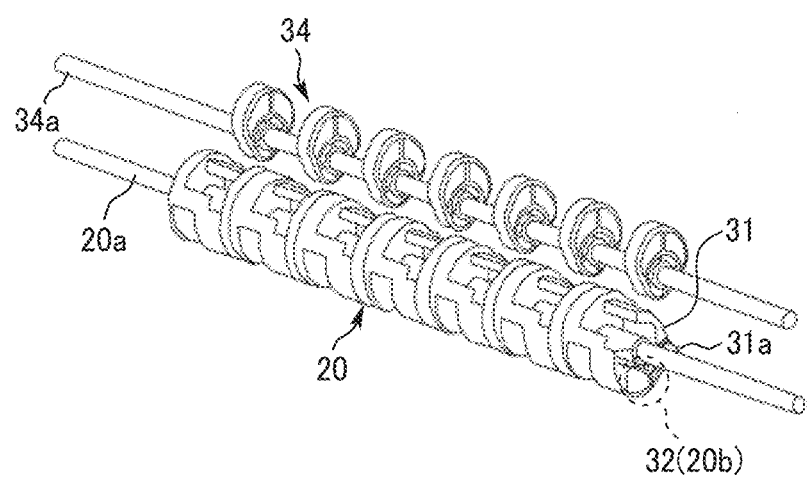
FIG. 3A is a perspective view illustrating the gripper that has moved to the gripping position in the sheet separation device illustrated in FIG. 1.
Figure 3B:
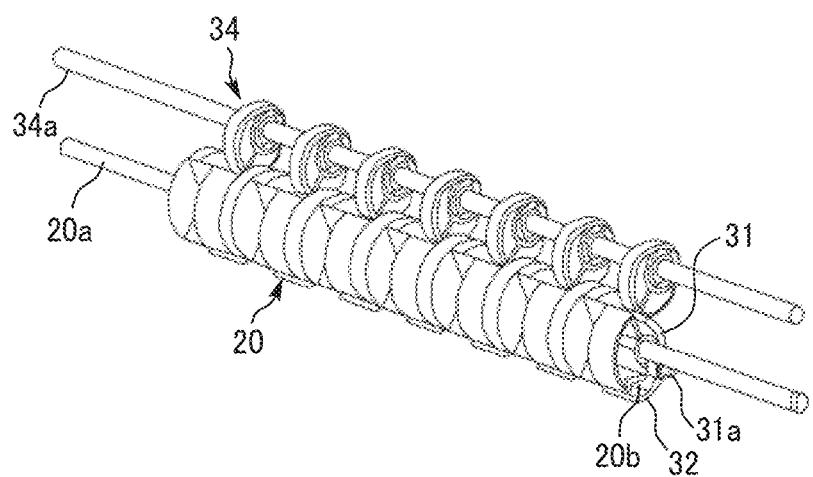
FIG. 3B is a perspective view illustrating the gripper that has moved to the releasing position in the sheet separation device illustrated in FIG. 1.

In contrast, as illustrated in FIGS. 2B and 3B, the arm 31 pressed by the cam 34 rotates counterclockwise in FIG. 2B about the support shaft 31a against the urging force of the compression spring 33 and separates the gripper 32 from the receiving portion 20b. This state is referred to as an open state. In the open state, the two-ply sheet PJ is not gripped, which is referred to as a grip release state.

When the gripper 32 is at the releasing position to be in the open state, the two-ply sheet PJ enters a space between the gripper 32 and the receiving portion 20b, and the gripper 32 moves to the gripping position to be in the closed state. As a result, the gripper 32 and the receiving portion 20b grip the two-ply sheet PJ.

In the present embodiment, as illustrated in FIG. 3, the winding roller 20 includes a plurality of roller portions (i.e. seven roller portions in the present embodiment) having a columnar shape and separated in the axial direction of the winding roller 20. A plurality of grippers 32 and a plurality of arms 31 are disposed at recesses between adjacent roller portions (that are portions between roller portions), respectively. A plurality of cams 34 are disposed to be able to abut against the plurality of arms 31, respectively.

Setting positions separated in the axial direction to grip the two-ply sheet PJ as described above, that is, not setting entire area in the axial direction to grip the two-ply sheet PJ can separate load necessary to grip the two-ply sheet PJ and be scratch resistant at the tip of one end of the two-ply sheet PJ. In addition, the above-described configuration is useful when a necessary gripping force becomes large, for example, when a large-sized two-ply sheet PJ or a heavy two-ply sheet PJ is gripped.

In this embodiment, as illustrated in FIG. 1, the third conveyance path K3 is made of linear conveyance guide plates. In contrast, the third conveyance path may be made of curved conveyance guide plates. In such a case, a gripping position at which the winding roller 20 grips the two-ply sheet PJ may be changed to be closer to the rotation shaft 20a than the gripping position in the present embodiment. Additionally, in such a case, the positions of the gripper 32 and the receiving portion 20b in the present embodiment may be interchanged, that is, in the winding roller 20, the gripper 32 may be disposed closer to the rotation shaft 20a than the receiving portion 20b.

Figure 4B:
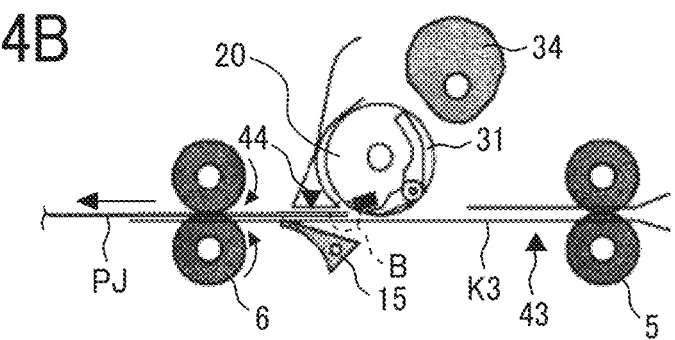
Figure 4C:
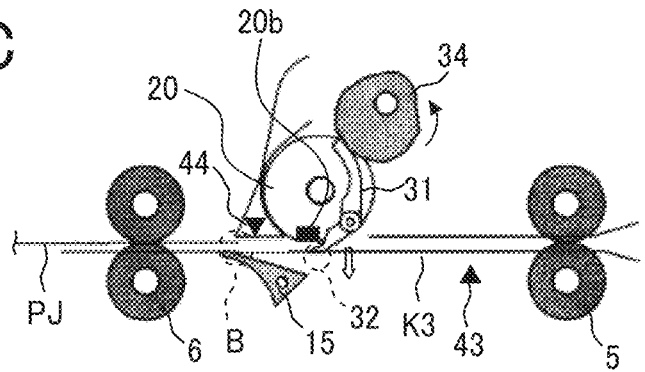
Figure 4D:
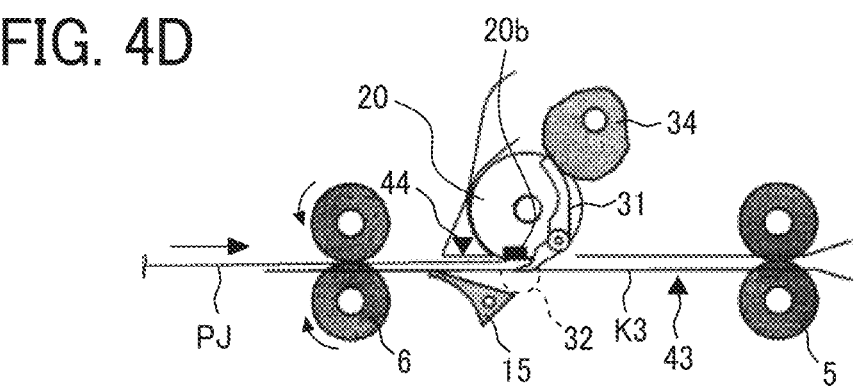

With reference to FIGS. 1, 4D, and 5A, the following describes the fourth sensor 44 in the sheet separation device 1 in the present embodiment. The fourth sensor 44 is the sheet detection sensor to detect two-ply sheet PJ conveyed toward the winding roller 20. Based on results detected by the fourth sensor 44 that is the sheet detection sensor, the controller controls the moving mechanism 30.

Specifically, the fourth sensor 44 is disposed on the conveyance path between the winding roller 20 and the third conveyance roller pair 6. As illustrated in FIGS. 4D and 5A, the third conveyance roller pair 6 conveys the two-ply sheet PJ in reverse toward the position of the winding roller 20, so that the gripped portion B of the two-ply sheet PJ becomes a front end in the reverse direction conveyance, and the fourth sensor 44 detects the front end of the two-ply sheet PJ conveyed in reverse, that is, the tip of one end of the gripped portion B. The controller uses a timing at which the fourth sensor 44 detects the tip of one end of the gripped portion B as a trigger to adjust and control a timing to stop the two-ply sheet PJ at the gripping position and a timing at which the gripper 32 grips the gripped portion B. Specifically, after a predetermined time has passed since the fourth sensor 44 detected the front end of the two-ply sheet PJ, the third conveyance roller pair 6 stops the reverse direction conveyance of the two-ply sheet PJ, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the end surface of the two-ply sheet PJ is sandwiched by the gripper 32 and the receiving portion 20b without abutting the end surface of the two-ply sheet PJ on any member.

As described above, the third conveyance roller pair 6 conveys the tip of one end of the gripped portion B of the two-ply sheet as a front end toward the winding roller 20 in the third conveyance path K3 between the third conveyance roller pair 6 and the winding roller 20.

With reference to FIGS. 6A to 6C, 9, and 10A to 10C, the separation claws 16 is described.

The separation claws 16 are claw-shaped members that are inserted into the gap C formed between two sheets P1 and P2 and between the winding roller 20 and the third conveyance roller pair 6 from both ends of the two-ply sheet PJ in the width direction of the two-ply sheet PJ in which the one end (that is the gripped portion B) is wound by the winding roller 20 and the other end (that is the bonding portion A) is nipped by the third conveyance roller pair 6.

Figure 6B:
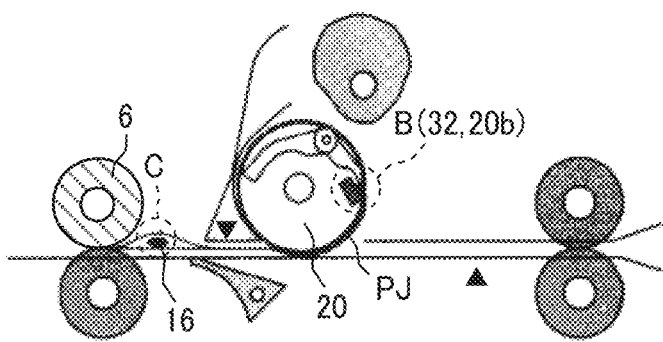
Figure 6C:
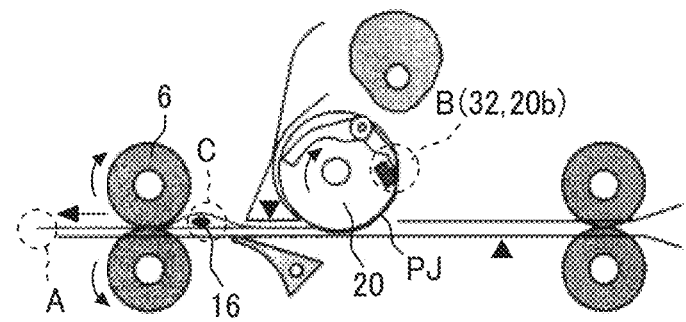
Figure 9:
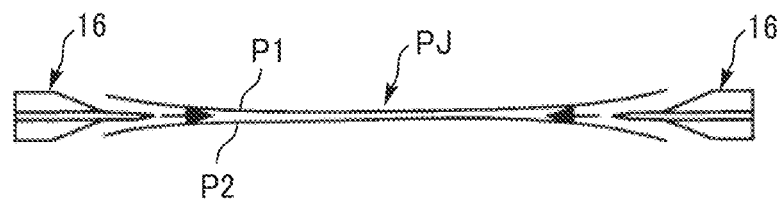
FIG. 9 is a schematic view illustrating separation claws inserted into a two-ply sheet in a width direction of the two-ply sheet.

Specifically, in the present embodiment, the separation claws 16 are disposed at both sides of the conveyance path in the width direction that is the direction perpendicular to a plane on which FIGS. 6A to 6C are illustrated and the horizontal direction in FIG. 9. The separation claw 16 has a fin extending in the vertical direction and a plate. In a direction in which the separation claw 16 is inserted into the two-ply sheet PJ, the plate has a tip at the center in a width direction of the plate and a back-end. Each of a plate thickness and a plate width in the plate gradually increases from the tip to the back-end. A vertical length of the fin gradually increases from the tip of the fin in the direction in which the separation claw 16 is inserted into the two-ply sheet PJ. The back-ends of the fin and the plate in the separation claw 16 form a cross shape (see FIG. 10A). A pair of separation claws 16 is moved in the width direction of the two-ply sheet PJ by a driving device controlled by the controller so as not to contact each other.

Figure 15A:
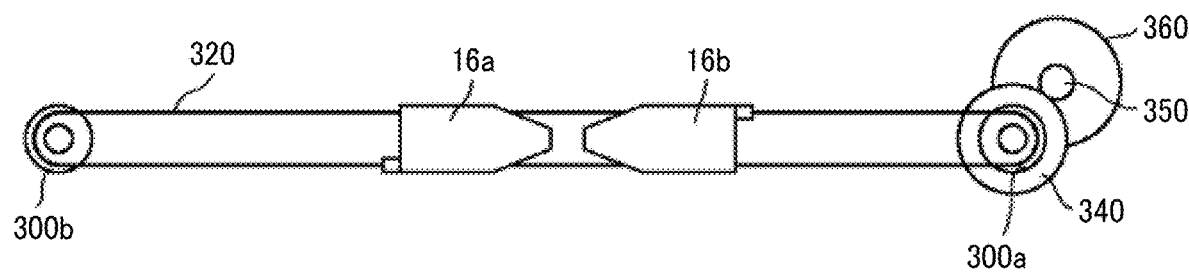
FIGS. 15A and 15B are schematic views illustrating examples of a driving device to move the separation claws.
Figure 15B:
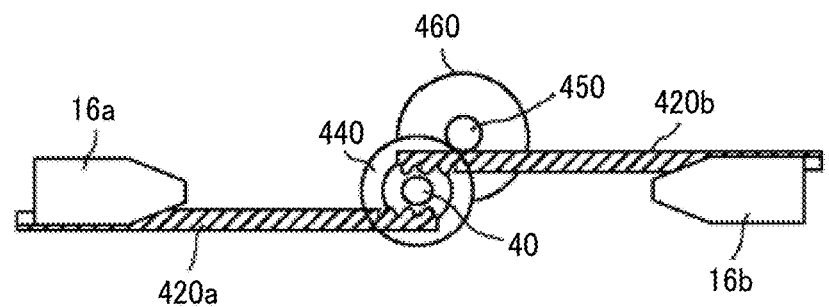

As illustrated in FIGS. 15A and 15B, the sheet separation device 1 according to the present embodiment includes two separation claws 16a and 16b disposed to face each other. In FIG. 15A, a belt driving device causes the two separation claws 16a and 16b to approach or move away from each other. In FIG. 15B, a rack and pinion driving device causes the two separation claws 16a and 16b to approach or move away from each other.

Specifically, the belt driving device in FIG. 15A includes a driving pulley 300a, a driven pulley 300b, and a belt 320 stretched between the driving pulley 300a and the driven pulley 300b.

The two separation claws 16a and 16b are attached to the belt 320 to face each other. One separation claw 16a is connected to the lower side of the belt 320, and the other separation claw 16b is connected to the upper side of the belt 320.

The belt driving device includes a drive transmission gear 340 attached to the driving pulley 300a. The drive transmission gear 340 receives the rotational driving force of the drive motor 360 via the motor output gear 350 and transmits the rotational driving force to the belt 320.

In FIG. 15A, clockwise rotation of the drive motor 360 causes the separation claws 16a and 16b to approach each other, and counterclockwise rotation of the drive motor 360 causes the separation claws 16a and 16b to move away from each other.

The rack and pinion driving device in FIG. 15B includes a pinion 400 and two racks 420a and 420b extending in opposite directions and meshing with the pinion 400.

The two separation claws 16a and 16b facing each other are attached to the racks 420a and 420b, respectively. The pinion 400 is attached a drive transmission gear 440. The drive transmission gear 440 receives the rotational driving force of the drive motor 460 via the motor output gear 450 and transmits the rotational driving force to the racks 420a and 420b.

In FIG. 15B, clockwise rotation of the drive motor 460 causes the separation claws 16a and 16b to approach each other, and counterclockwise rotation of the drive motor 460 causes the separation claws 16a and 16b to move away from each other.

Figure 10A:
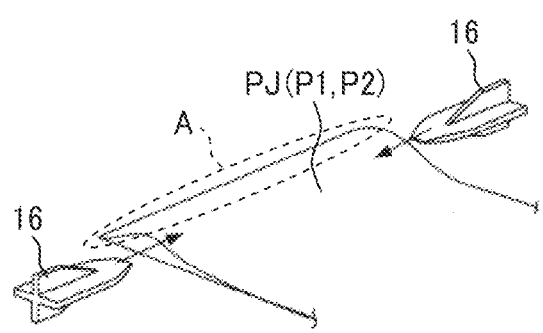
FIGS. 10A to 10C are perspective views illustrating operations of the separation claws in the width direction.
Figure 10B:
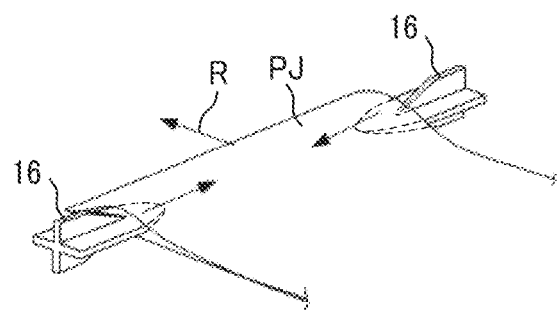
Figure 10C:
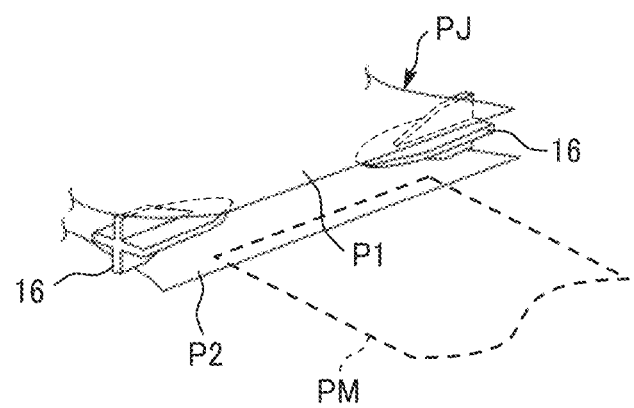

The separation claws 16 configured as described above stand by at standby positions illustrated in FIG. 10A at which the separation claws 16 do not interfere with the conveyance of the sheet such as the two-ply sheet PJ in the third conveyance path K3 until the gap C is formed in the two-ply sheet PJ as illustrated in FIG. 6A. Subsequently, as illustrated in FIGS. 9 and 10B, the separation claws 16 enter the gap C in the two-ply sheet PJ when the two-ply sheet PJ (configured by two sheets P1 and P2) is separated. As a result, the separation claws 16 secure the gap C to be large.

Figure 7A:
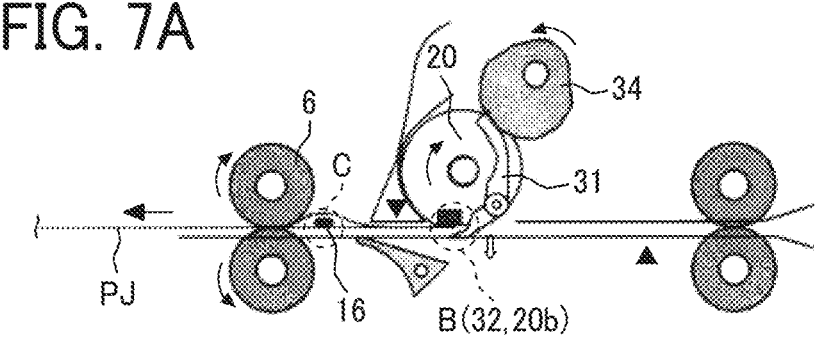
FIGS. 7A to 7C are schematic views of the main part of the sheet separation device illustrated in FIG. 1, illustrating operations of the sheet separation device, subsequent from the operations of FIGS. 6A to 6C.
Figure 7B:
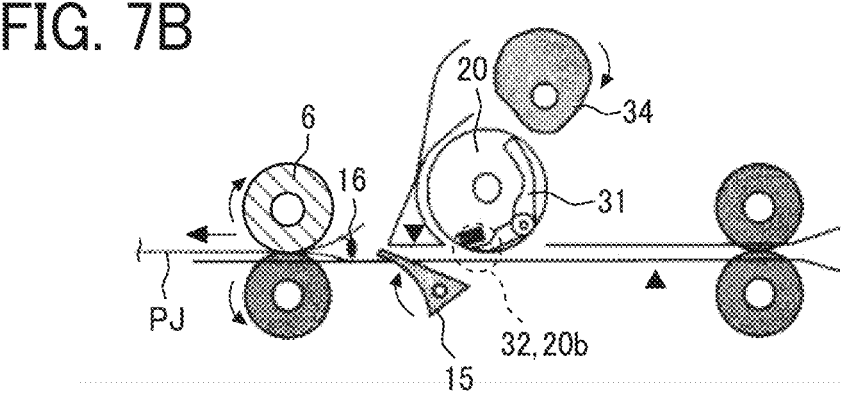
Figure 7C:
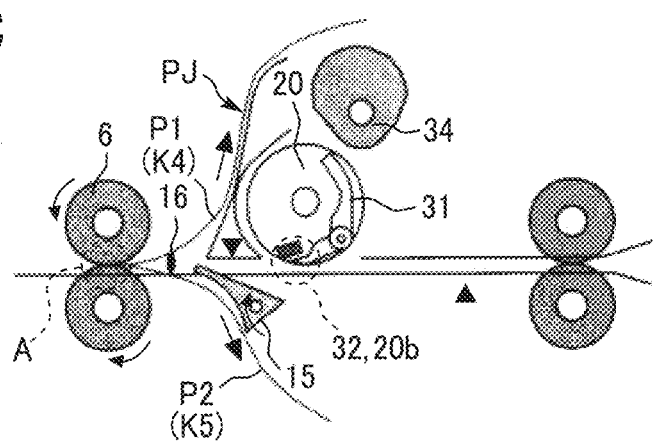

With reference to FIGS. 7A to 7C, the switching claws 15 are described. The switching claws 15 are disposed between the separation claws 16 and the winding roller 20. The two-ply sheet PJ is separated into the two sheets P1 and P2 by the separation claws 16, and the two sheets P1 and P2 are given stiffness. The switching claws 15 separately guides the two sheets P1 and P2 to the two branched conveyance paths K4 and K5, respectively. The two branched conveyance paths K4 and K5 are branched from the third conveyance path K3 in different directions, and the third conveyance path K3 sandwiched by the two branched conveyance paths K4 and K5. The switching claws 15 are claw-shaped moving members and rotate in forward or in reverse within a range of a predetermined angle to guide the two-ply sheet PJ.

Specifically, in the present embodiment, the switching claws 15 are a plurality of claws divided with a gap therebetween in the width direction that is the direction perpendicular to a plane on which FIGS. 7A to 7C are illustrated. The switching claws 15 are configured to be rotatable about a support shaft. The controller controls a driving device that rotates the switching claws 15.

The switching claws 15 configured as described above stand by at standby positions as illustrated in FIG. 7A at which the switching claws 15 do not interfere with the conveyance of the sheets such as the two-ply sheet PJ in the third conveyance path K3 before the switching claws 15 guide the sheets P1 and P2 with stiffness that are separated from the two-ply sheet PJ by the separation claws 16 to the branched conveyance paths K4 and K5. When the switching claws 15 guide the two sheets P1 and P2 separated from the two-ply sheet PJ by the separation claw 16 to the branched conveyance paths K4 and K5, respectively, the switching claws 15 rotate to positions at which the switching claws 15 prevent the two-ply sheet PJ from entering the third conveyance path K3 when viewed from the two-ply sheet PJ as illustrated in FIG. 7B.

As a result, the first sheet P1 is guided to the first branched conveyance path K4, and the second sheet P2 is guided to the second branched conveyance path K5.

Figure 8A:
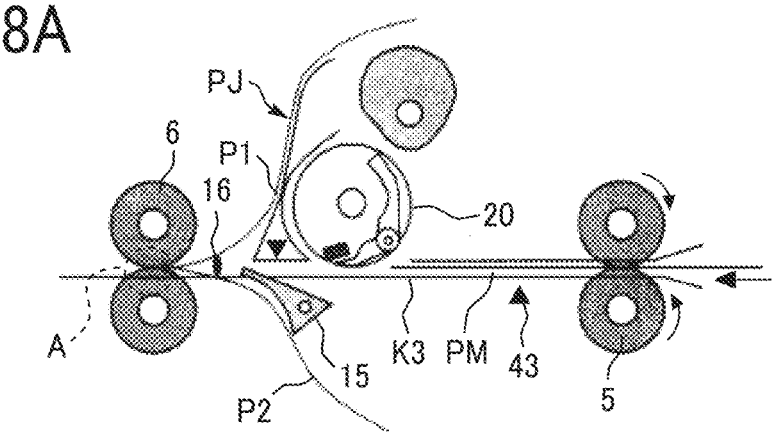
FIGS. 8A to 8C are schematic views of the main part of the sheet separation device illustrated in FIG. 1, illustrating operations of the sheet separation device, subsequent from the operations of FIGS. 7A to 7C.
Figure 8B:
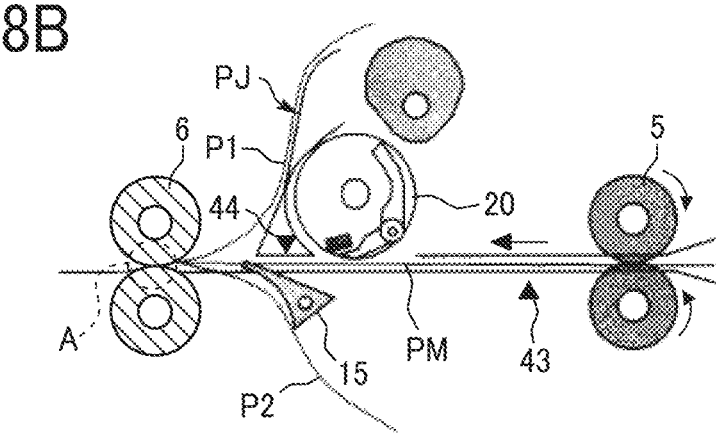
Figure 8C:
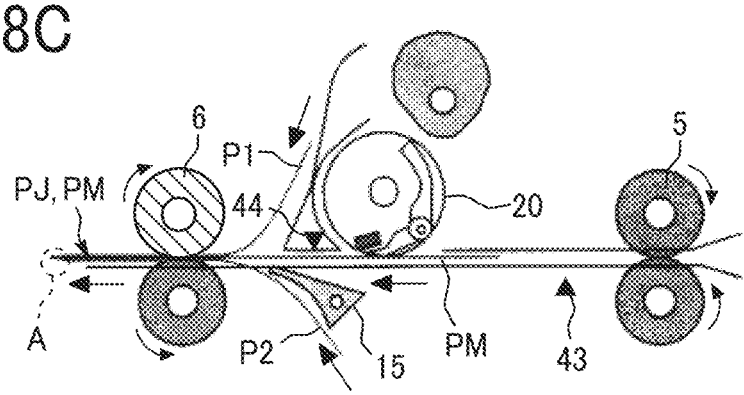

Specifically, as illustrated in FIG. 7A, the third conveyance roller pair 6 conveys the other end of the two-ply sheet PJ to the left side in FIG. 7A after the separation claws 16 are inserted into the gap C until the winding of the one end of the two-ply sheet PJ on the winding roller 20 is released. After the third conveyance roller pair 6 conveys the two-ply sheet PJ as illustrated in FIG. 7B, the third conveyance roller pair 6 conveys the one end of the two-ply sheet PJ to the right side as illustrated in FIG. 7C again, and the switching claws 15 guide the first sheet P1 separated by the separation claws 16 to the first branched conveyance path K4 and guide the second sheet P2 to the second branched conveyance path K5. Subsequently, as illustrated in FIGS. 8A to 8C, the second conveyance roller pair 5 conveys the insertion sheet PM to the third conveyance path K3, that is, the right side in FIGS. 8A to 8C to insert the insertion sheet PM between the two sheets P1 and P2 separated from the two-ply sheet PJ.

With reference to FIGS. 4A to 8C, the following describes operations of the sheet separation device 1 to separate the two-ply sheet PJ.

In the description of the operations, operations of the separation claws 16 is appropriately described with reference to FIGS. 9 and 10A to 10C, and the control flow is described with reference to a flowchart of FIG. 11, that is, FIGS. 11A and 11B.

Figure 11A:
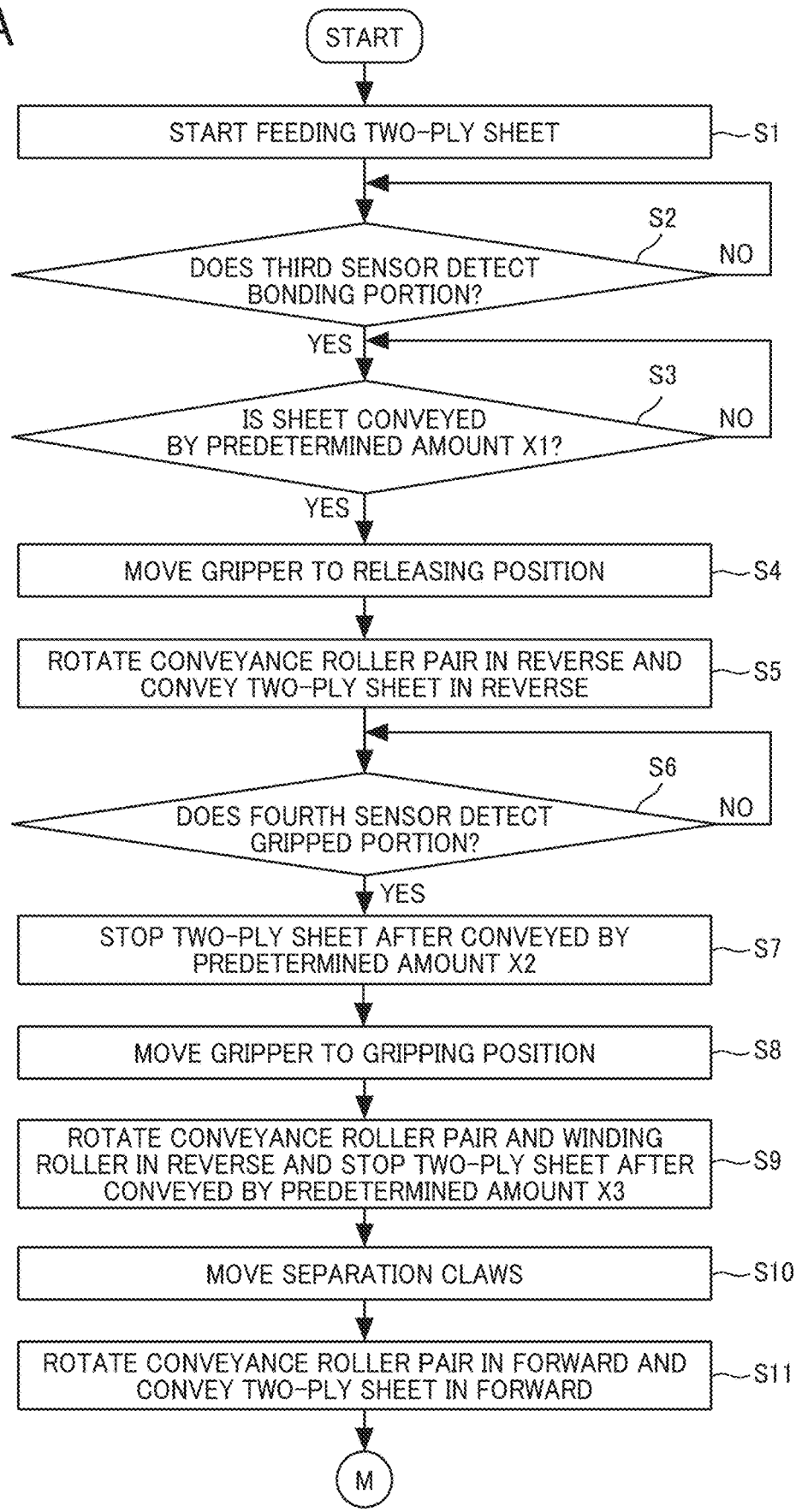
FIGS. 11A and 11B is a flowchart illustrating control performed in the sheet separation device.

After the first feed roller 2 starts feeding the two-ply sheet PJ on the first feed tray 11 in step S1 of FIG. 11A, as illustrated in FIG. 4A, the second conveyance roller pair 5 conveys the two-ply sheet PJ with the bonding portion A as a front end in the forward direction that is a direction from the right side to the left side in FIG. 4A in the third conveyance path K3.

At this time, the controller controls the moving mechanism 30 so that the gripper 32 is positioned at the gripping position inside the outer periphery of the winding roller 20. That is, the cam 34 rotates to move to a position at which the cam 34 does not push the arm 31. When the gripper 32 is positioned at the gripping position as described above, the gripper 32 does not interfere the sheet conveyance in the third conveyance path K3. In addition, the free end of the switching claws 15 rotate downward and stand by at the standby positions at which the switching claws 15 do not interfere with the conveyance of the sheets in the third conveyance path K3.

Subsequently, as illustrated in FIG. 4B, the third conveyance roller pair 6 conveys the two-ply sheet PJ in the forward direction until the gripped portion B of the two-ply sheet PJ (that is the one end of the two-ply sheet PJ and a back end of the two-ply sheet PJ conveyed in the forward direction) passes through the position of the winding roller 20. After the two-ply sheet PJ is further conveyed in the forward direction, the third conveyance roller pair 6 stops the conveyance of the two-ply sheet PJ as illustrated in FIG. 4C. In order to determine the timing to stop the conveyance of the two-ply sheet PJ, the controller uses the timing at which the third sensor 43 detects the bonding portion A of the two-ply sheet PJ (that is a front end of the two-ply sheet PJ conveyed in the forward direction and the other end of the two-ply sheet PJ) as a trigger in step S2 of FIG. 11A. After the timing, that is, after the third sensor 43 detects the bonding portion A of the two-ply sheet PJ, the controller determines whether the third conveyance roller pair 6 conveys the two-ply sheet PJ by a predetermined amount X1 in step S3 of FIG. 11A and stops the conveyance of the two-ply sheet PJ at the timing at which the third conveyance roller pair 6 conveys the two-ply sheet PJ by a predetermined amount X1.

When the third conveyance roller pair 6 temporarily stops the conveyance of the two-ply sheet PJ, as illustrated in FIG. 4C, the gripper 32 moves from the gripping position to the releasing position in step S4 of FIG. 11A. That is, the cam 34 rotates to move to a position at which the cam 34 pushes the arm 31. In this state, the gripped portion B of the two-ply sheet PJ can be received between the gripper 32 and the receiving portion 20b.

Then, as illustrated in FIG. 4D, the third conveyance roller pair 6 rotates in reverse to start conveyance of the two-ply sheet PJ in the reverse direction in step S5 of FIG. 11A. At this time, in order to convey the gripped portion B of the two-ply sheet PJ to the gripping position of the gripper 32 in the winding roller 20, the fourth sensor 44 detects the gripped portion B of the two-ply sheet PJ that is the one end of the two-ply sheet PJ and the front end of the two-ply sheet PJ conveyed in the reverse direction.

Subsequently, as illustrated in FIG. 5A, the controller uses the timing at which the fourth sensor 44 detects the gripped portion B of the two-ply sheet PJ as a trigger in step S6 of FIG. 11A and stops the conveyance of the two-ply sheet PJ in step S7 of FIG. 11A at a timing at which the third conveyance roller pair 6 conveys the two-ply sheet PJ by a predetermined amount X2 that is a timing at which the gripped portion B of the two-ply sheet PJ reaches the position of the winding roller 20 that is the gripping position.

After the gripped portion B reaches the position of the winding roller 20, as illustrated in FIG. 5B, the gripper 32 is moved from the releasing position to the gripping position in step S8 of FIG. 11A. That is, the cam 34 rotates to move to the position at which the cam does not push the arm 31. In this state, as illustrated in FIG. 5B', the end surface of the one end of the two-ply sheet PJ does not abut on any member, and the gripped portion B is gripped between the gripper 32 and the receiving portion 20b.

Next, as illustrated in FIG. 5C, the winding roller 20 rotates in reverse (that is, counterclockwise) while the gripper 32 grips the two-ply sheet PJ, and the third conveyance roller pair 6 again rotates in reverse together with the winding roller 20. As the winding roller 20 rotates, the gap C is formed between the two sheets P1 and P2 of the two-ply sheet PJ between the winding roller 20 and the third conveyance roller pair 6 as illustrated in FIG. 5D.

As described above, the fourth sensor 44 to detect the front end of the two-ply sheet PJ conveyed in reverse is disposed between the third conveyance roller pair 6 and the winding roller 20 and downstream in the reverse direction from the third conveyance roller pair 6. Since the controller uses the timing at which the fourth sensor 44 detects the gripped portion B of the two-ply sheet PJ conveyed in reverse as the trigger to determine the timing at which the gripper 32 and the receiving portion 20b grip the gripped portion B, the gripped portion B of the two-ply sheet PJ can be accurately conveyed to a desired gripping position regardless of variations in sheet lengths with respect to the sheet conveyance amount X2 (Note that the size of sheets includes an error even if the sheets are sold as the same size).

Disposing the fourth sensor 44 near the winding roller 20 between the third conveyance roller pair 6 and the winding roller 20 can shorten the sheet conveyance amount X2 that is measured since the fourth sensor 44 detects the front end of the two-ply sheet PJ conveyed in the reverse direction regardless of the sheet length. The above-described configuration can reduce variation in the conveyance amount X2 and enables an accurate conveyance of the gripped portion B of the two-ply sheet PJ to the desired gripping position.

Accordingly, the fourth sensor 44 is preferably disposed near the winding roller 20.

In step S9 of FIG. 11A, after the third conveyance roller pair 6 continues to rotate in reverse and the winding roller 20 starts the winding of the two-ply sheet PJ, as illustrated in FIG. 6A, the third conveyance roller pair 6 stops the conveyance of the two-ply sheet PJ and the winding roller 20 stops the winding of the two-ply sheet PJ at the timing at which the third conveyance roller pair 6 conveys the two-ply sheet by a predetermined amount X3. In this state, the two-ply sheet PJ is wound around the winding roller 20 one or more times, and the gap C in the two-ply sheet PJ is sufficiently widened. In addition, the bonding portion A of the two-ply sheet PJ is sandwiched by the third conveyance roller pair 6.

Next, as illustrated in FIG. 6B, the separation claws 16 are inserted into the gap C in the two-ply sheet PJ that is sufficiently widened in step S10 of FIG. 11A. That is, as illustrated in FIGS. 9 and 10A, each of the pair of separation claws 16 is moved from the standby position to a position to separate the two-ply sheet PJ.

Next, as illustrated in FIG. 6C, the third conveyance roller pair 6 and the winding roller 20 start rotating in forward, that is, clockwise in step S11 of FIG. 11A after the separation claws 16 are inserted into the gap C.

At this time, the bonding portion A may not be sandwiched by the third conveyance roller pair 6 when rotations of the winding roller 20 in forward (clockwise) can convey the two-ply sheet PJ. That is, the rotations of the winding roller 20 in forward may convey the bonding portion A of the two-ply sheet PJ to the third conveyance roller pair 6, the bonding portion A may be sandwiched by the third conveyance roller pair 6, and the third conveyance roller pair 6 may convey the two-ply sheet PJ.

Figure 11B:
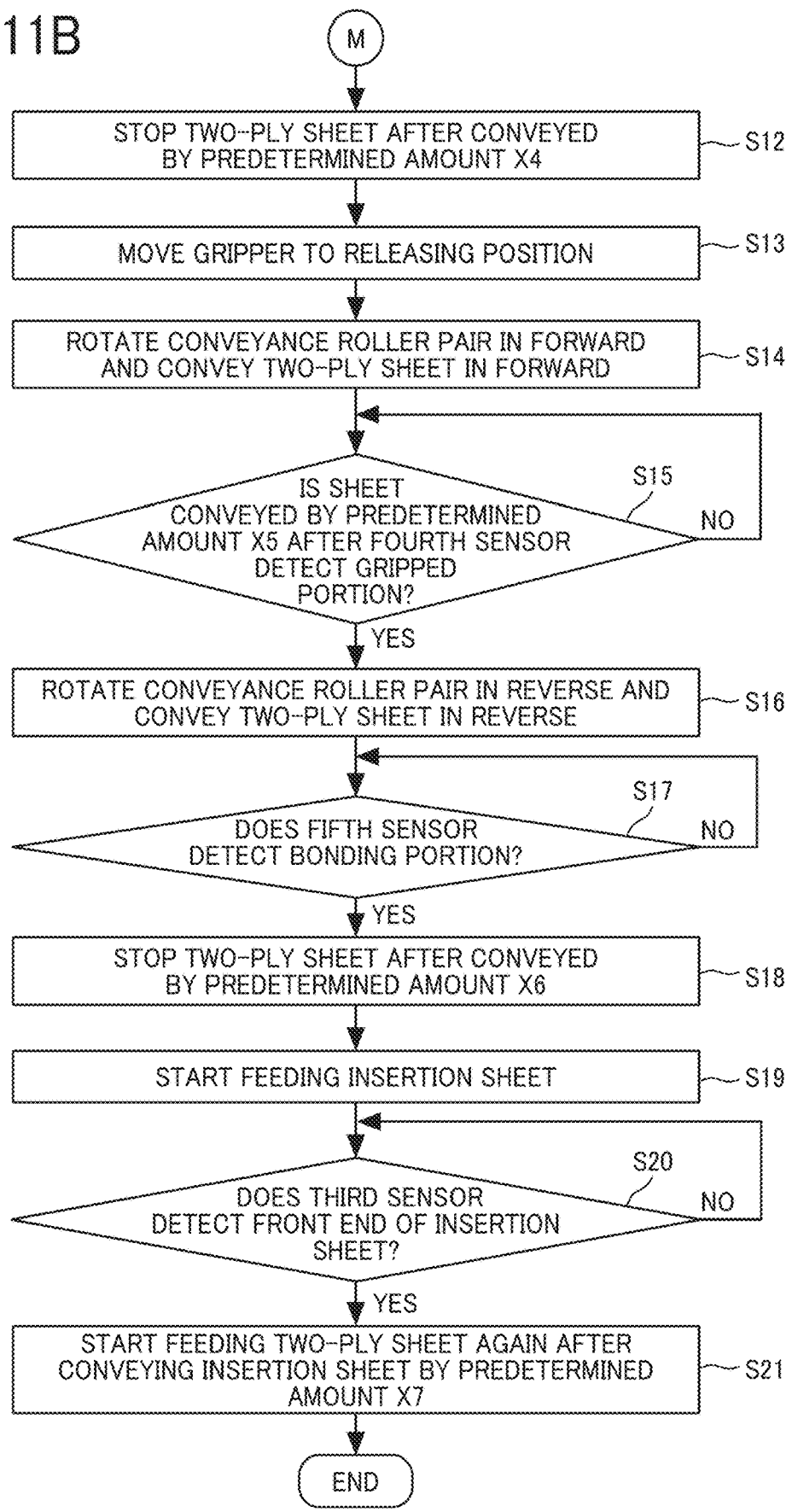

In step S12 of FIG. 11B, as illustrated in FIG. 7A, the controller stops forward rotation in the third conveyance roller pair 6 and forward rotation in the winding roller 20 after the forward rotation in the third conveyance roller pair 6 conveys the two-ply sheet PJ by a predetermined amount of X4. At this time, the two-ply sheet PJ is not wound around the gripper 32, and the gripper 32 can release the gripping of the gripped portion B of the two-ply sheet PJ.

In this state, the gripper 32 moves from the gripping position to the releasing position so that the gripper 32 is in the third conveyance path K3 in step S13 of FIG. 11B. That is, the cam 34 rotates as illustrated in FIG. 2B to move to the position at which the cam 34 pushes the arm 31. The gripper 32 releases gripping the two-ply sheet PJ. In the present embodiment, the cam 34 in the moving mechanism 30 moves to release the gripping of the gripper 32, but the third conveyance roller pair 6 may pull the two-ply sheet from the gripper 32 to release the gripping and convey the two-ply sheet without the above-described movement of the cam 34 in the moving mechanism 30 when a pulling force due to the conveyance of the third conveyance roller pair 6 is larger than a force of the gripper 32 that grips the tow-ply sheet PJ.

In step S14 of FIG. 11B, as illustrated in FIG. 7B, the third conveyance roller pair 6 again rotates in forward to start conveyance of the two-ply sheet PJ in the forward direction. At this time, the fourth sensor 44 detects the gripped portion B of the two-ply sheet PJ that is the one end of the two-ply sheet PJ and the back end of the two-ply sheet PJ conveyed in the forward direction to stop the gripped portion B of the two-ply sheet PJ near the separation claws 16. In addition, the gripper 32 moves from the releasing position to the gripping position, and the switching claws 15 rotates clockwise from the standby position to a switching position. When the gripped portion B that is the back end of the two-ply sheet PJ conveyed in the forward direction reaches the vicinity of the separation claws 16 as illustrated in FIG. 7B, back ends of the two sheets P1 and P2 are largely separated and opened (see FIG. 10C).

The controller determines whether the third conveyance roller pair 6 conveys the two-ply sheet PJ by a predetermined amount X5 after the timing, as a trigger, at which the fourth sensor 44 detects the back end of the two-ply sheet PJ conveyed in the forward direction in step S15 of FIG. 11B and stops the conveyance of the two-ply sheet PJ when the third conveyance roller pair 6 conveys the two-ply sheet PJ by a predetermined amount X5. In step S16 of FIG. 11B, the third conveyance roller pair 6 rotates in reverse to start a conveyance of the two-ply sheet PJ in the reverse direction as illustrated in FIG. 7C. At this time, since the free ends of the switching claws 15 are disposed at the switching positions at which the switching claws 15 block the two-ply sheet PJ moving to the third conveyance path K3, the two sheets P1 and P2 separated each other are guided to the two branched conveyance paths K4 and K5, respectively, as illustrated in FIG. 7C. At this time, the fifth sensor 45 (see FIG. 1) detects the bonding portion A of the two-ply sheet PJ that is the other end of the two-ply sheet PJ and the back end of the two-ply sheet PJ conveyed in the reverse direction to stop the conveyance of the two-ply sheet PJ so that the vicinity of the bonding portion A in the two-ply sheet PJ is nipped by the third conveyance roller pair 6.

Subsequently, the controller uses, as a trigger, the timing at which the fifth sensor 45 (see FIG. 1) detects the back end of the two-ply sheet PJ conveyed in the reverse direction that is the bonding portion A in step S17 of FIG. 11B and stops the conveyance of the two-ply sheet PJ at a timing at which the third conveyance roller pair 6 conveys the two-ply sheet PJ by a predetermined amount X6 as illustrated in FIG. 8A in step S18 of FIG. 11B. When the third conveyance roller pair 6 conveys the two-ply sheet PJ by the predetermined amount X, the bonding portion A of the two-ply sheet PJ is in the nip of the third conveyance roller pair 6 or at a position slightly leftward from the nip. That is, the third conveyance roller pair 6 nips the other end of the two-ply sheet PJ.

Subsequently, as illustrated in FIG. 8A, the controller starts feeding the insertion sheet PM from the second feed tray 12 (see FIG. 1) in step S19 of FIG. 11B. At this time, the third sensor 43 detects the front end of the insertion sheet PM conveyed in the forward direction that is also referred to as the other end of the insertion sheet PM. In addition, as illustrated in FIG. 8B, the separation claw 16 moves to the standby position.

Subsequently, the controller uses the timing at which the third sensor 43 detects the front end of the insertion sheet PM as a trigger in step S20 of FIG. 11B. After the second conveyance roller pair 5 conveys the insertion sheet PM by a predetermined amount X7 since the third sensor 43 detects the front end of the insertion sheet PM, the third conveyance roller pair 6 again starts the conveyance of the two-ply sheet PJ in the forward direction in step S21 of FIG. 11B as illustrated in FIG. 8C. At this time, the insertion sheet PM is accurately sandwiched at a desired position between the two sheets P1 and P2.

As described above, the controller ends processes to insert the insertion sheet PM into the space between the two sheets P1 and P2 in the two-ply sheet PJ. The third conveyance roller pair 6 conveys the two-ply sheet PJ with the insertion sheet PM inserted therein in the forward direction, and the two-ply sheet PJ with the insertion sheet PM inserted therein is placed on the ejection tray 13 (see FIG. 1).

The sheet separation device 1 in the present embodiment forms the gap C between the two sheets P1 and P2 of the two-ply sheet PJ at the non-bonding portion near the bonding portion A in the state illustrated in FIG. 6A to separate (peel) the two sheets P1 and P2.

In contrast, the bonding portion A may be set as the gripped portion in the state illustrated in FIG. 6A if the third conveyance roller pair 6 nips the two-ply sheet PJ with sufficiently strong force. That is, in FIGS. 5A to 5D, the bonding portion A of the two-ply sheet PJ is gripped by the gripper 32 and the receiving portion 20b, the two-ply sheet PJ is wound around the winding roller 20, and the non-bonding portion is nipped and conveyed by the third conveyance roller pair 6. At this time, the sheets P1 and P2 of the two-ply sheet PJ are conveyed in synchronization with each other without slipping by the rotation of the third conveyance roller pair 6. For example, increasing the nip pressure of the third conveyance roller pair 6, using roller material having a large coefficient of friction, or controlling the driving of the third conveyance roller pair 6 using various kinds of methods reduces slippage of the two sheets P1 and P2 to be less likely to occur, and the two sheets P1 and P2 can be separated (peeled) by forming a desired gap C in the two-ply sheet PJ. The above-described configuration can also reduce the number of times of conveyance of the two-ply sheet PJ until the insertion sheet PM is inserted into the two-ply sheet PJ.

Next, a first variation is described.

Figure 12:
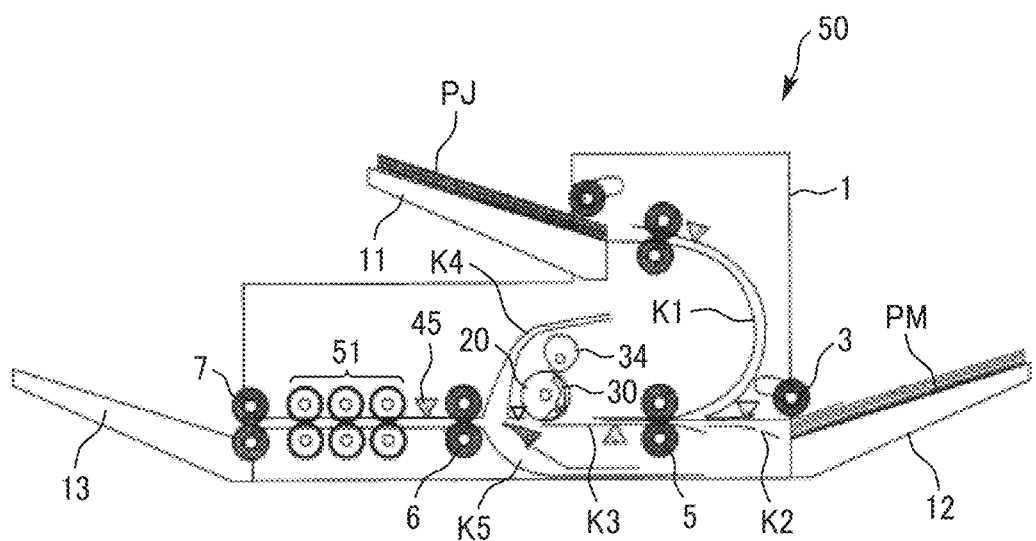
FIG. 12 is a schematic view illustrating a laminator according to a first variation.

As illustrated in FIG. 12, a laminator 50 as the first variation includes the sheet separation device 1 illustrated in FIG. 1.

The laminator 50 includes a lamination processor 51 downstream from the third conveyance roller pair 6 in the sheet separation device 1 in the forward direction. The lamination processor 51 performs a laminating process on the two-ply sheet PJ in which the insertion sheet PM is inserted between the two sheets P1 and P2 separated by the sheet separation device 1.

The lamination processor 51 includes a plurality of heat and pressure roller pairs that apply heat and pressure to the two-ply sheet PJ while conveying, in the forward direction, the two-ply sheet PJ into which the insertion sheet PM is inserted. The two-ply sheet PJ into which the insertion sheet PM is inserted inside passes through the lamination processor 51, and the entire region of the two-ply sheet PJ is joined. The two-ply sheet PJ subjected to the laminating process described above is ejected to the outside of the lamination processor 51 by an ejection roller pair 7 and is placed on the ejection tray 13.

As described above, the laminator 50 according to the first variation performs a process to feed the sheets PJ and PM, a process to separate the two sheets P1 and P2 in the two-ply sheet PJ, a process to insert the insertion sheet PM into the space between the two separated sheets P1 and P2, and a process to perform the laminating process on the two-ply sheet PJ in which the insertion sheet PM is inserted, as a sequence of processes, thus enhancing the convenience for a user.

Since a part of the two-ply sheet PJ including a damaged front end surface is hard for the laminating process, the configuration of the present disclosure is useful.

Next, a second variation is described.

Figure 13:
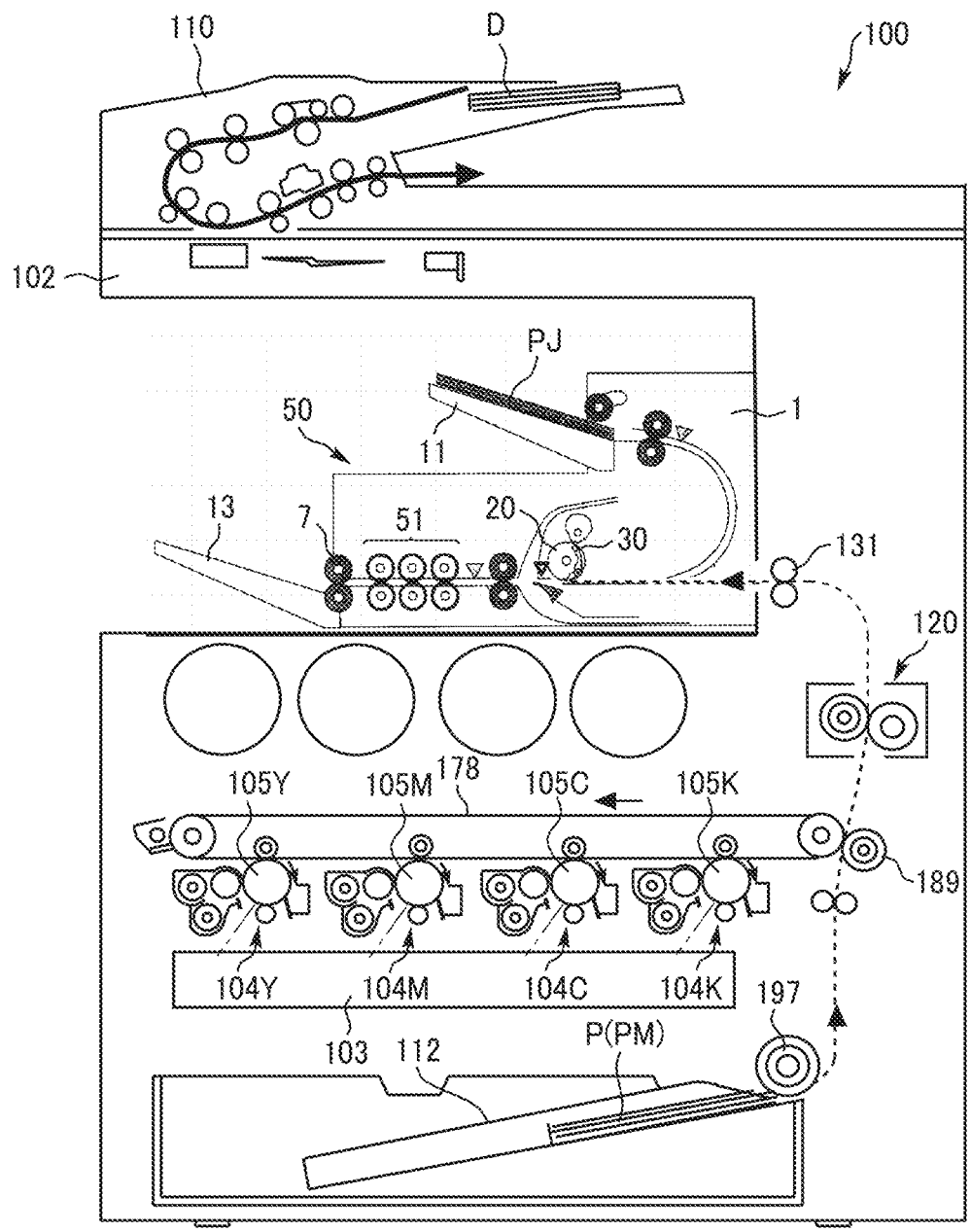
FIG. 13 is a schematic view illustrating an image forming apparatus according to a second variation.

As illustrated in FIG. 13, an image forming apparatus 100 as a second variation includes the laminator 50 illustrated in FIG. 12 and an image forming apparatus main body that forms an image on a sheet P.

With reference to FIG. 13, in the image forming apparatus 100, multiple pairs of sheet conveying rollers disposed in the document conveying unit 110 feeds the original document D from a document loading table and conveys the original document D in a direction indicated by arrow in FIG. 13, and the original document D passes over the document reading device 102. The document reading device 102 optically reads image data of the original document D passing over the document reading device 102.

The image data optically read by the document reading device 102 is converted into electric signals and transmitted to a writing device 103. The writing device 103 emits laser beams onto the photoconductor drums 105Y, 105M, 105C, and 105K based on the electric signals of the image data in each of colors, respectively, performing an exposure process.

On the photoconductor drums 105Y, 105M, 105C, and 105K of the image forming units 104Y, 104M, 104C, and 104K, a charging process, the exposure process, and a developing process are performed to form desired images on the photoconductor drums 105Y, 105M, 105C, and 105K, respectively.

The images formed on the photoconductor drums 105Y, 105M, 105C, and 105K are transferred and superimposed onto the intermediate transfer belt 178 to form a color image. The color image formed on the intermediate transfer belt 178 is transferred to the surface of a sheet P (which is a sheet to be the insertion sheet PM) fed and conveyed by a feed roller 197 from a feeding device 112 at a position at which the intermediate transfer belt 178 faces the secondary transfer roller 189.

After the color image is transferred onto the surface of the sheet P (that is the insertion sheet PM), the sheet P is conveyed to the position of a fixing device 120. The fixing device 120 fixes the transferred color image on the sheet P.

Thereafter, the sheet P is ejected from the image forming apparatus main body by an ejection roller pair 131 and is fed into the laminator 50 as the insertion sheet PM. When the laminator 50 including the sheet separation device 1 receives the insertion sheet PM, the laminator 50 has completed the process described with reference to FIGS. 4A to 7C (that is, the process to separate the two-ply sheet PJ) and performs the process described with reference to FIGS. 8A to 8C (that is, the process to insert the insertion sheet PM into the two-ply sheet PJ) after the laminator 50 receives the insertion sheet PM. After the lamination processor 51 performs the laminating process on the two-ply sheet PJ into which the insertion sheet PM is inserted, the ejection roller pair 7 ejects the two-ply sheet PJ to the outside of the lamination processor 51 to place the two-ply sheet PJ on the ejection tray 13.

As described above, a series of image formation processes (i.e. printing operations) in the image forming apparatus 100 and a series of sheet separation processes and the laminating process using the insertion sheet PM on which the image is formed are completed.

In the second variation, the image forming apparatus 100 includes the laminator 50, but may include the sheet separation device 1 illustrated in FIG. 1.

The image forming apparatus 100 according to the second variation of the present disclosure is a color image forming apparatus but may be a monochrome image forming apparatus. The image forming apparatus 100 according to the second variation of the present disclosure employs electrophotography, but the present disclosure is not limited to this. The present disclosure may be applied to other types of image forming apparatuses such as an inkjet image forming apparatus and a stencil printing machine.

Lastly, a third variation is described.

Figure 14:
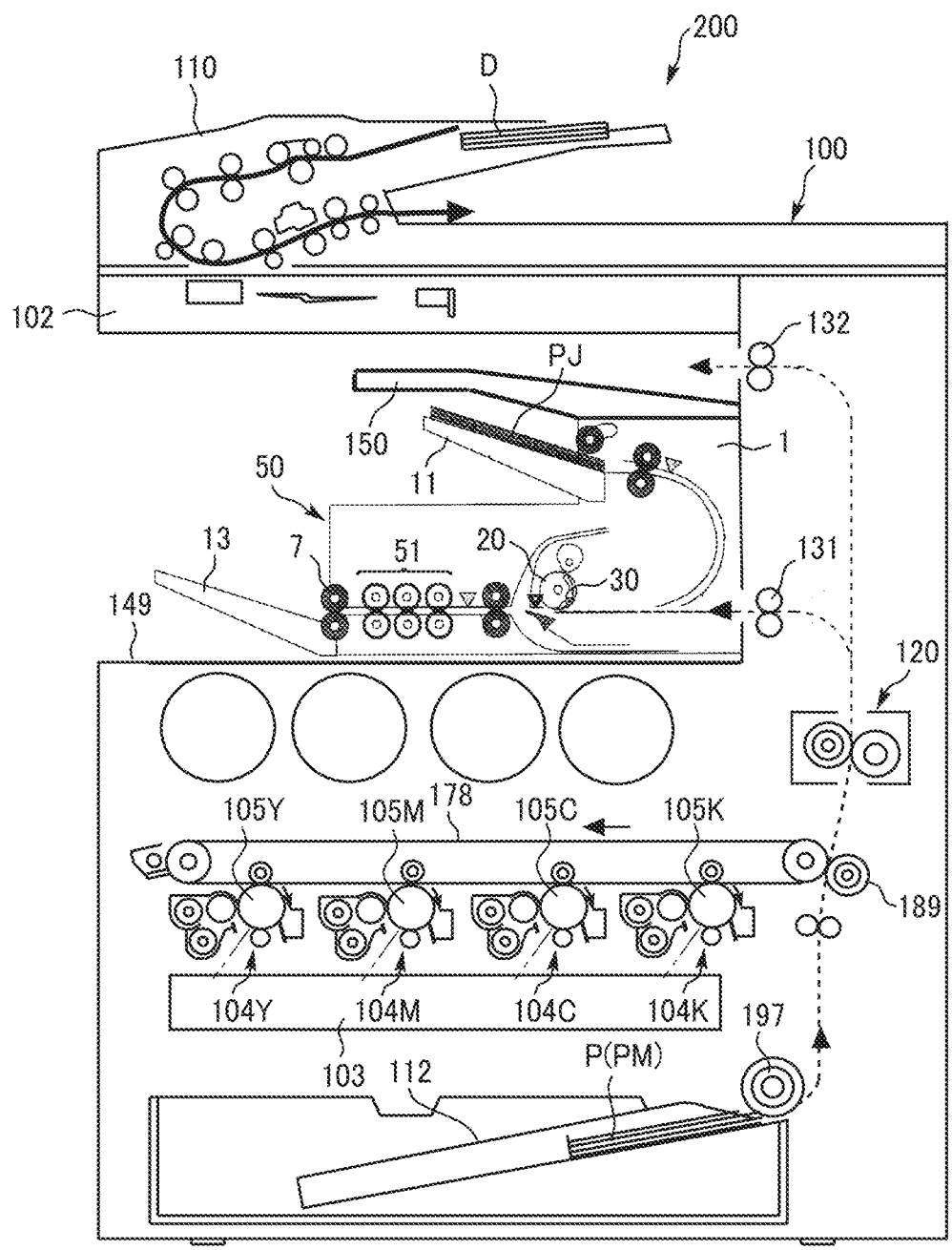
FIG. 14 is a schematic view illustrating an image forming system according to a third variation.

As illustrated in FIG. 14, an image forming system 200 according to the third variation includes the image forming apparatus 100 illustrated in FIG. 13 that forms the image on the sheet P and the laminator 50 illustrated in FIG. 12, and the laminator 50 is detachably installed in the image forming apparatus 100.

In image forming system 200 illustrated in FIG. 14, the image forming apparatus 100 performs the image formation described above with reference to FIG. 12 and ejects the sheet P (that is the insertion sheet bearing the formed image from the ejection roller pair 131 to the laminator 50, and the laminator 50 performs the laminating process on the two-ply sheet PJ into which the insertion sheet PM has been inserted, and the ejection roller pair 7 ejects the two-ply sheet PJ to the outside of the laminator 50 to place the two-ply sheet PJ on the ejection tray 13.

When the user does not select a laminating process mode as described above, the image forming apparatus 100 in the image forming system 200 ejects the sheet P formed the image by the image formation process from a second ejection roller pair 132 to the outside of the image forming apparatus 100 to place the sheet P on a second ejection tray 150.

The laminator 50 is detachably installed in the image forming apparatus 100 and can be detached from the image forming apparatus 100 when the laminator 50 is not necessary. The image forming apparatus 100 from which the laminator 50 is detached uses a placement surface 149 to place the laminator 50 as an ejection tray to place the sheet P formed the image by the image formation process and ejected from the ejection roller pair 131 to the outside of the image forming apparatus 100.

In the third variation, the image forming system 200 includes the detachable laminator 50. However, the image forming system 200 may include the sheet separation device 1 illustrated in FIG. 1 detachable.

As described above, the sheet separation device 1 according to the present embodiment separates the non-bonding portion of the two-ply sheet PJ in which the two sheets P1 and P2 are overlapped and bonded at the bonding portion A and includes the winding roller 20 that rotates in a predetermined rotation direction to wind the two-ply sheet PJ and the gripper 32 disposed in the winding roller 20. The gripper 32 grips the gripped portion B of the two-ply sheet PJ at one end of the two-ply sheet PJ without abutting the tip of the one end of the two-ply sheet PJ on any member and winds the two-ply sheet PJ around the winding roller 20 to separate the two-ply sheet PJ.

The above-described configuration can separate the two sheets P1 and P2 constituting the two-ply sheet PJ without damaging the two sheets P1 and P2 and without increasing the size of the sheet separation device 1.

The present disclosure is not limited to the above-described embodiment and variations, and the configuration of the present embodiment can be appropriately modified other than suggested in the above embodiment and variations within a scope of the technological concept of the present disclosure. The number, position, and shape of each of the components described above are not limited to the embodiment and variations described above. Desirable number, position, and shape can be determined to perform the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

What is claimed is:

1. A sheet separation device configured to separate a two-ply sheet in which two sheets are overlapped, the sheet separation device comprising:
    a winder configured to rotate and wind the two-ply sheet;
    a gripper in the winder; and
    a controller configured to cause the gripper to grip a gripped portion of the two-ply sheet at one end of the two-ply sheet without abutting a tip of the gripped portion at the one end of the two-ply sheet, the gripped portion including at least parts of both of the two sheets.

2. The sheet separation device according to claim 1, wherein the controller is configured to cause the gripper to grip the gripped portion between the gripper and a receiving portion of the winder.

3. The sheet separation device according to claim 2, wherein an end surface of the one end of the two-ply sheet coincides with an end of a contact surface of the receiving portion, the two-ply sheet being between the end of the contact surface and the gripper when gripped by the gripper.

4. The sheet separation device according to claim 2, wherein an end surface of the one end of the two-ply sheet is on an outside of an end of a contact surface of the receiving portion.

5. The sheet separation device according to claim 2, wherein an end surface of the one end of the two-ply sheet is on a contact surface of the receiving portion, the gripper is configured to grip the two-ply sheet at the contact surface, and an end of the contact surface does not contact the two-ply sheet.

6. The sheet separation device according to claim 2, wherein at least one of the gripper or the receiving portion is made of an elastic material.

7. The sheet separation device according to claim 1, wherein the controller is configured to cause the gripper to move between a gripping position at which the gripper grips the two-ply sheet and a releasing position at which the gripper releases the two-ply sheet.

8. The sheet separation device according to claim 7, further comprising:
    a sheet detection sensor configured to detect the two-ply sheet being conveyed toward the winder,
    wherein the controller is configured to cause the gripper to move based on a detection result of the sheet detection sensor.

9. The sheet separation device according to claim 1, further comprising:
    an arm configured to rotate about a support shaft and hold the gripper;
    a biasing member configured to bias the arm; and
    a cam configured to push the arm against a biasing force of the biasing member.

10. The sheet separation device according to claim 1, further comprising:
    a conveyance roller pair configured to convey the two-ply sheet toward the winder with the one end as a front end; and
    a separation claw configured to insert in a width direction of the two-ply sheet into a gap between the two sheets of the two-ply sheet with the one end wound around winder, the gap being between the winder and the conveyance roller pair.

11. The sheet separation device according to claim 10, further comprising:
    a switching claw between the separation claw and the winder and configured to guide the two sheets in different directions.

12. The sheet separation device according to claim 11, further comprising:
    another conveyance roller pair configured to convey and insert an insertion sheet into a space between the two sheets separated by the separation claw,
    wherein the controller is configured to
    cause the conveyance roller pair to convey the two-ply sheet to release the one end of the two-ply sheet wound around the winder from winder after the separation claw is inserted into the gap and subsequently convey the two-ply sheet toward the switching claw,
    cause the switching claw to guide the two sheets separated by the separation claw and conveyed by the conveyance roller pair in the different directions, and
    cause the another conveyance roller pair is to convey the insertion sheet to insert the insertion sheet between the two sheets guided in the different directions.

13. The sheet separation device according to claim 1, wherein the two sheets are bonded together at a bonding portion of the two-ply sheet and the two-ply sheet has the bonding portion at another end opposite the one end.

14. The sheet separation device of claim 1, further comprising:
    a number of rollers configured to convey the two-ply sheet to the winder.

15. The sheet separation device of claim 1, wherein the controller is configured to cause the winder to rotate the parts of both of the two sheets when the gripped portion of the two-ply sheet is gripped by the gripper.

16. A laminator comprising:
    the sheet separation device according to claim 1; and
    a lamination processor configured to perform a laminating process on the two-ply sheet with an insertion sheet inserted between the two sheets separated by the sheet separation device.

17. An image forming apparatus comprising:
    the laminator according to claim 16; and
    an image forming body configured to form an image on a sheet.

18. An image forming system, comprising:
    an image forming apparatus configured to form an image on a sheet, and
    the laminator according to claim 16 detachably attached to the image forming apparatus.

19. An image forming apparatus comprising:
    the sheet separation device according to claim 1; and an image forming body configured to form an image on a sheet.

20. An image forming system comprising:
an image forming apparatus configured to form an image on a sheet, and
the sheet separation device according to claim 1 detachably attached to the image forming apparatus.

* * * * *